Oct. 27, 1959   J. WEIR   2,910,090
CONE VALVE

Filed Sept. 6, 1956   2 Sheets-Sheet 1

James Weir
INVENTOR.

BY
Attorneys

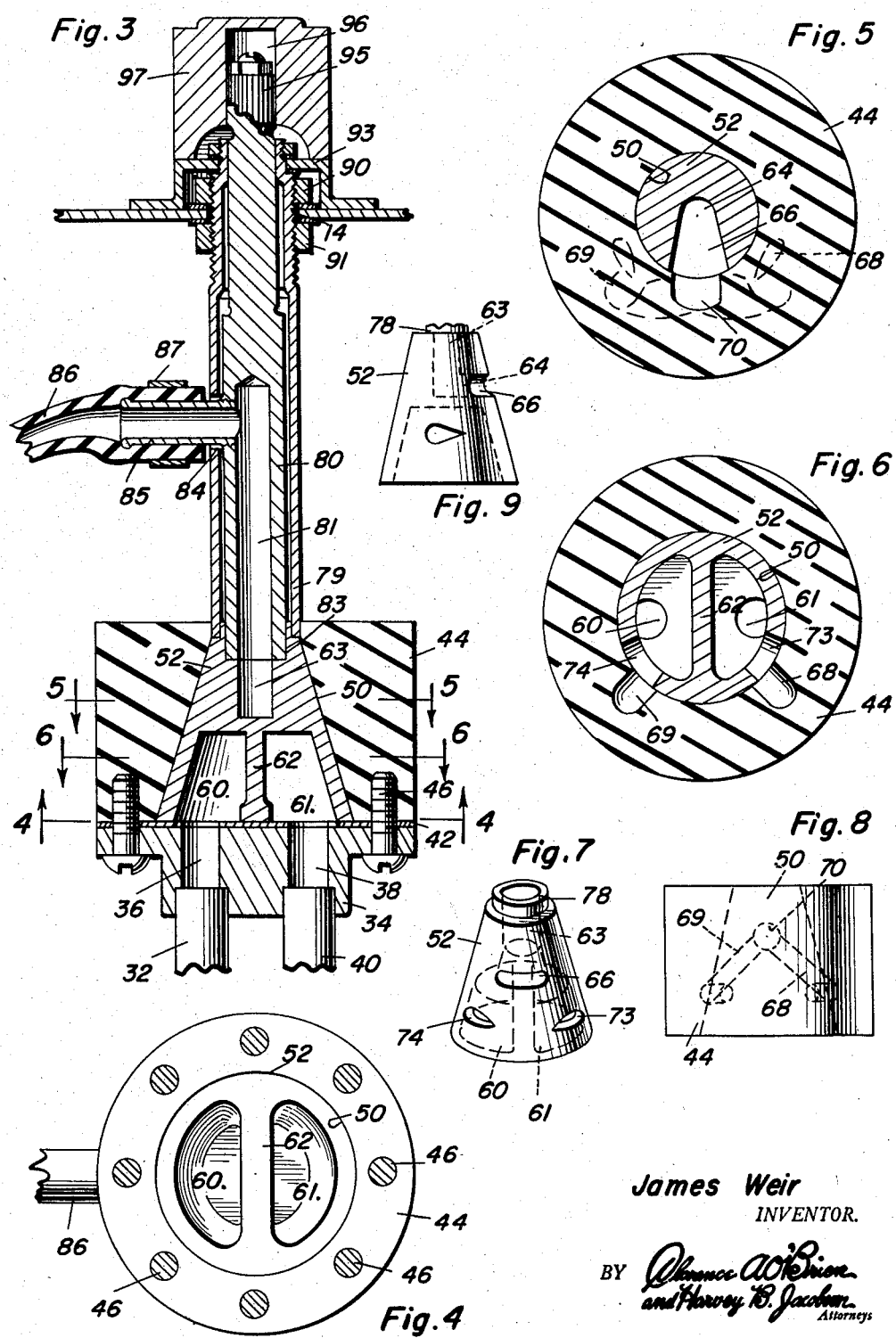
Oct. 27, 1959 — J. WEIR — 2,910,090
CONE VALVE
Filed Sept. 6, 1956 — 2 Sheets-Sheet 2
James Weir
INVENTOR.

United States Patent Office 2,910,090
Patented Oct. 27, 1959

2,910,090

CONE VALVE

James Weir, Canton, Ill.

Application September 6, 1956, Serial No. 608,348

3 Claims. (Cl. 137—625.41)

This invention relates to a combination hot and cold liquid mixing valve especially useful in connection with sinks, tubs and the like.

An object of the present invention is to provide a liquid distribution arrangement for a sink, tub or the like wherein there is a single spout preferably of the swing or displaceable type together with a single control that operates a mixing valve, the latter being arranged to supply the spout with mixed liquids at the desired temperature level.

A further object of the present invention is to provide an improved mixing valve of the type which includes a generally conical valve member that is rotatable in a body having a similarly shaped seat, the valve member being of special construction relying on the water pressure to maintain it seated and to prevent leakage, the valve member having water accommodating recesses that are in registry with the hot and the cold water supplies and whose walls are formed with ports at registry with passageways in the valve body, the latter conducting liquid from the recesses and applying it to a passage in the valve member, this mixed water ultimately reaching the water outlet bore in the valve stem. The quantities of hot and cold liquids that are mixed in order to yield the desired temperature of mixed liquid that ultimately issues through the spout are regulated by rotating a single control which, in turn, actuates the valve member so as to bring the ports into registry greater or lesser amounts with the passageways in the valve body. Inasmuch as the cross-sectional area of ports that is in registry with the system of passageways is regulatable in this manner, the proportions of hot and cold liquids which ultimately issue from the mixing valve are likewise regulatable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a longitudinal sectional view of the mixing valve in Figure 2;

Figure 4 is a transverse sectional view of the mixing valve taken on the line 4—4 of Figure 3;

Figure 5 is a transverse sectional view taken on the line 5—5 of Figure 3;

Figure 6 is a sectional view taken on the line 6—6 of Figure 3;

Figure 7 is a perspective view of the conical valve member that constitutes a part of the invention;

Figure 8 is an elevational view of the valve body in which the valve member of Figure 7 is operable; and Figure 9 is a side view of the valve body in Figure 7.

Figure 1:
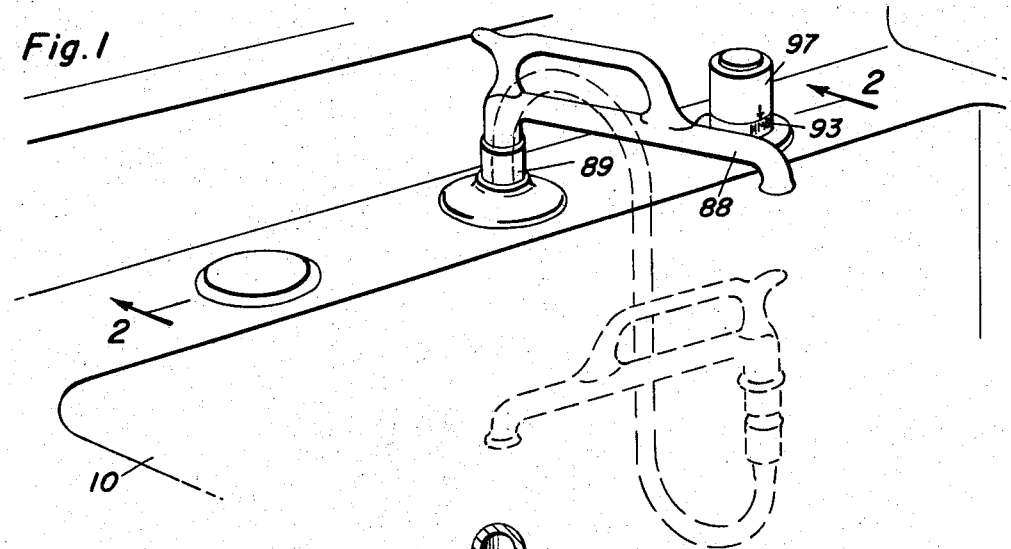
Figure 1 is a perspective view of a part of a sink, tub or the like with which the principles of the invention are practiced.
Figure 2:
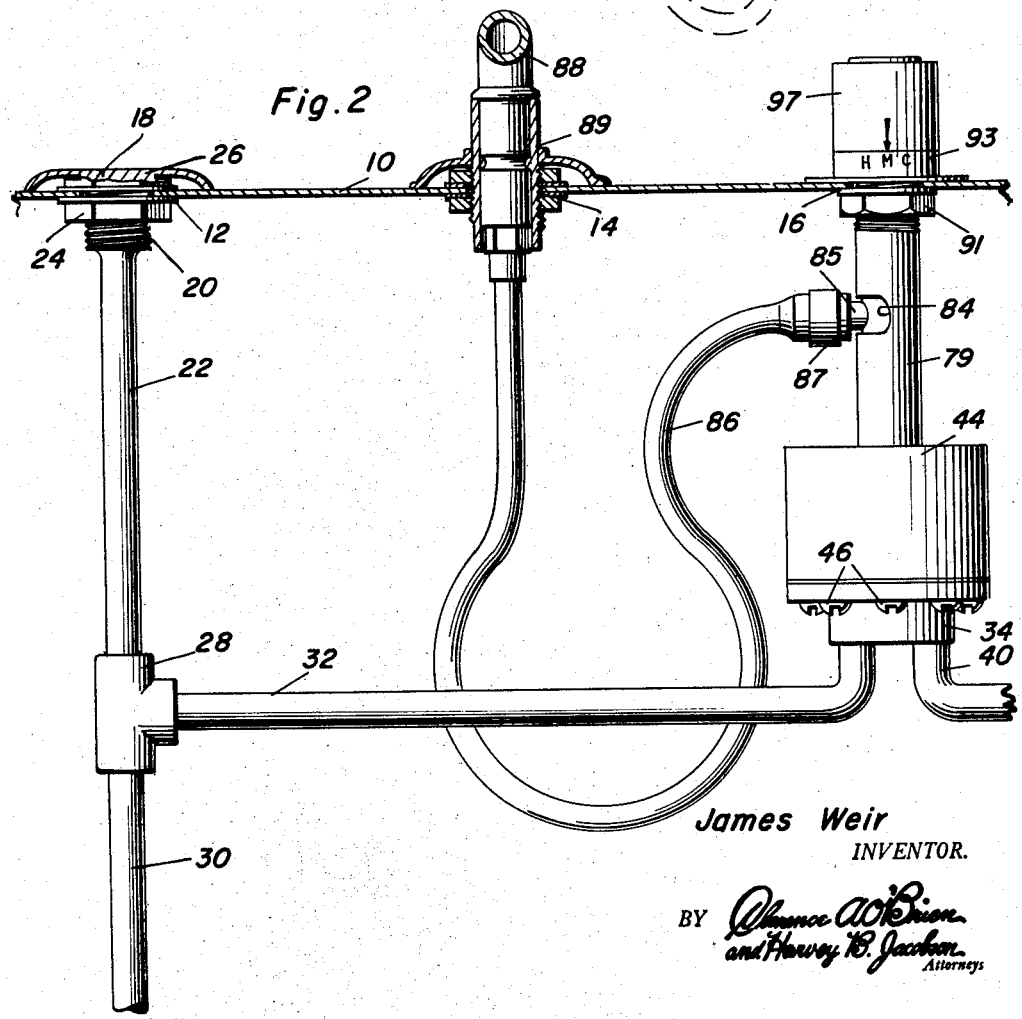
Figure 2 is a transverse sectional view taken on the line 2—2 of Figure 1.

In the accompanying drawings there is a water distributing system for a sink 10, tub or the like. In standard basins, bowls, tubs, etc., there are ordinarily provided three openings 12, 14 and 16. When such a plumbing fixture is used, one of the openings, for example opening 12 will have a cap such as cap 18 disposed thereover and held in place by being threaded on the threaded end 20 of shank 22. This shank is of a solid bar stock and has a nut 24 on threaded part 20, the nut backing against the bottom surface of the fixture while the threaded part 26 of cap 18 abuts the opposite surface of the fixture. A T-fitting 28 is threaded on the shank 22 and has the hot water pipe 30 connected therewith. This hot water pipe conducts hot water from a source of the same and it passes through pipe 32 which is also threaded in T-fitting 28. Pipe 32 is registry with flange or cover plate 34, the latter having two passages 36 and 38. The hot water supply pipe 32 is in registry with passage 36 while the cold water supply pipe 40 is in registry with passage 38. A gasket 42 is on the surface of flange 34 and has the valve body 44 abutting the same. Bolts 46 are passed through holes in the flange 34 and are threaded into the valve body 44 after passing through holes in the gasket 42. In this way the valve body is firmly attached in registry with the sources of hot and cold water. It is preferred that the valve body be made of a yieldable material, for example hard rubber "Teflon" or other durable plastic.

Valve body 44 has a valve chamber 50 which is in the shape of a truncated cone with a smaller diameter part remote from flange 34. A valve member 52 is mounted for rotation in the valve chamber 50 and is in the shape of a truncated cone. This valve member is of special construction (Figures 5, 6, 7 and 9) and has two recesses 60 and 61 separated by partition 62 and opening through the wider diameter end of the valve member 52. The recesses are adapted to be in alignment with the sources of hot and cold liquid and are exposed to the pressures thereof. These pressures maintain the valve member firmly seated against the wall of valve chamber 50 and thereby prevent leakage. Passage or recess 63 extends through a part of the valve member and opens through the smaller end of the valve member. This passage is arranged on the longitudinal axis of the valve member, this being the axis of rotation. There is a lateral branch 64 of passage 63 which opens through the side wall of valve member 52 at slot or port 66. This slot is arranged so as to be in registry with passageways 68 and 69 in valve body 44 and at their junction 70. These passageways have their ends arranged to be registered with the ports 73 and 74 formed in the valve member and opening into recesses 61 and 60 respectively. Ports 73 and 74 are approximately semi-circular at one end and are tapered to a point at the opposite end to provide non-linear area registry with the circular ends of the passageways 68 and 69 in response to rotation of the valve body.

The upper end of the valve member has a collar 78 protruding therefrom around which the lower extremity of mounting sleeve 79 is disposed, being fitted therearound and within the circular recess at the upper part of the valve body 44. Shank 80 having a central longitudinal bore 81, is disposed in counterbore 83 formed in passage 63 and is fixed, as by sweating or otherwise joining, to the valve body 52. Mounting sleeve 79 has a slot 84 in its side wall through which nipple 85 passes. This nipple is threaded to the shank 80 and is in registry with the bore 81. Hose 86 is connected by hose clamp 87 onto the nipple 85 and is connected with spout 88 of any standard type, for example the type which is fitted in socket 89 carried in hole 14 in the plumbing fixture 10. The upper extremity of the mounting sleeve 79 is threaded and has upper and lower mounting nuts 90 and 91 thereon and disposed on gaskets that are located on opposite surfaces of the plumbing fixture adjacent to hole 14. The same type of locking arrangement is provided for the collar 93, the latter being a trim fitting on which indicia, as "cold," "medium" and "hot" or inscriptions of similar import may be provided. The upper extremity of shank 80 has a knurled part 95 fitted in bore 96 of knob 97. This knob is adapted to be manually actuated in order to select a temperature of liquid that ultimately issues from the spout 88.

In operation knob 97 is rotated thereby rotating stem or shank 80 and this turns the valve member 52 in order to bring selected amounts of the valve ports 73 and 74 into registry with the ends of the passageways 68 and 69. This means that selected quantities of hot and cold liquid, as water, pass from the recesses 60 and 61, through the ports, into the passageways and finally into passage 63 and bore 81 for discharge through hose 86. At all times the recesses in the valve member maintain the liquid under a static pressure tending to hold the valve member seated and thereby prevent leakage.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A mixing valve for hot and cold water, said valve comprising a valve body having a valve chamber, a valve member rotatably mounted in said chamber and having hot and cold water recesses, hot and cold water inlet passages communicating with the respective recesses, said member having a side wall through which ports open, there being one port in registry with each recess, a shank extending from said valve member and having a mixed water outlet bore, a water passage extending through said valve member and in communication with said bore, two passages in said valve body adapted to selectively and respectively connect said valve member ports with said valve member passage when said shank is rotated through a predetermined range, a mounting sleeve extending from said valve member and having a lateral opening therein, a nipple rigidly connected to said shank and in registry with said bore, said nipple being passed through said lateral opening and adapted to receive a liquid discharge hose thereon, and an operating handle rigidly fixed to the upper end of said shank.

2. A mixing valve comprising a valve body provided with a frusto-conical open-ended valve chamber, a cover plate secured to said body at the major end of said chamber and provided with a pair of inlet passages, a tubular mounting sleeve secured at one end thereof to said body coaxially with the minor end of said chamber, a frusto-conical valve member rotatably disposed in said chamber and provided in its major end portion with a pair of inlet recesses communicating with the respective inlet passages, the minor end portion of said valve member having an outlet recess formed centrally therein, a cylindrical shank secured at one end thereof to the minor end of said valve member and formed with an axial bore having a blind outer end and communicating at its inner end with said outlet recess, said shank being rotatable in and projecting outwardly from said sleeve, means at the projecting end of said shank for rotating the same and the associated valve member, said valve member being provided at its lateral wall with an outlet port and a pair of inlet ports communicating respectively with said outlet and inlet recesses, said body being provided in the side wall of said chamber with a pair of convergent ducts having an outlet port opening at their point of convergence in constant communication with said outlet port and also having a pair of inlet port openings at their divergent ends in proportionately variable communication with the respective inlet ports, and a laterally projecting outlet nipple provided on the intermediate portion of said shank in communication with the bore thereof, said sleeve being formed with a laterally disposed clearance opening having said nipple movably disposed therein to facilitate limited rotation of said shank in said sleeve.

3. The device as defined in claim 2 wherein said inlet ports of said valve member are elongated and tapered in a direction circumferential of the valve member, each inlet port being relatively wide and relatively narrow at its respective opposite ends.

References Cited in the file of this patent

UNITED STATES PATENTS

| 680,447 | Swedin | Aug. 13, 1901 |
| 1,035,401 | Wright | Aug. 13, 1912 |
| 1,413,288 | Nell | Apr. 18, 1922 |
| 2,344,150 | Judell | Mar. 14, 1944 |
| 2,608,378 | Hinderer | Aug. 26, 1952 |
| 2,623,752 | Wentz et al. | Dec. 30, 1952 |

FOREIGN PATENTS

| 46,876 | France | Aug. 4, 1936 |

OTHER REFERENCES

Pensak: (abstract of application No. 712,679 published April 21, 1953; 669 O.G. 919).